US012679856B2

(12) United States Patent
Yu et al.

(10) Patent No.: US 12,679,856 B2
(45) Date of Patent: Jul. 14, 2026

(54) METHOD OF PREPARING ASYMMETRIC PHOSPHATE-BASED COMPOUND

(71) Applicant: SOULBRAIN CO., LTD., Gyeonggi-do (KR)

(72) Inventors: Weon Ju Yu, Gyeonggi-do (KR); Jae Yeol Ma, Gyeonggi-do (KR); Kwang Ju Jung, Gyeonggi-do (KR); Dae Hwan Yoo, Gyeonggi-do (KR)

(73) Assignee: SOULBRAIN CO., LTD., Gyeonggi-do (KR)

( * ) Notice: Subject to any disclaimer, the term of this patent is extended or adjusted under 35 U.S.C. 154(b) by 308 days.

(21) Appl. No.: 18/704,096

(22) PCT Filed: Oct. 18, 2022

(86) PCT No.: PCT/KR2022/015817

§ 371 (c)(1),
(2) Date: Apr. 24, 2024

(87) PCT Pub. No.: WO2023/075263

PCT Pub. Date: May 4, 2023

(65) Prior Publication Data

US 2024/0409568 A1 Dec. 12, 2024

(30) Foreign Application Priority Data

Oct. 27, 2021 (KR) ........................ 10-2021-0144222

(51) Int. Cl.
*C07F 9/6578* (2006.01)

(52) U.S. Cl.
CPC .................................. *C07F 9/6578* (2013.01)

(58) Field of Classification Search
CPC ..................................................... C07F 9/6578
See application file for complete search history.

(56) References Cited

U.S. PATENT DOCUMENTS 9,246,187 B2 1/2016 Amine et al.
2012/0094190 A1 4/2012 Mimura et al.

FOREIGN PATENT DOCUMENTS

JP 3586872 B2 11/2004
KR 101345181 B1 12/2013
WO 2021261978 A1 12/2021
WO 2022139533 A1 6/2022
WO 2022139534 A1 6/2022

OTHER PUBLICATIONS

Müller, L. K., et al., "Multifunctional poly(phosphoester)s with two orthogonal protective groups" RSC Advances, 2015, vol. 5, No. 53, pp. 42881-42888 (Jan. 1, 2015).
Johnston, K. F., et al., "Synthesis of vinyloxy phosphorus monomers from the enolate of acetaldehyde" Polymer bulletin, 2000, vol. 45, No. 4-5, pp. 359-364 (Dec. 14, 2020).
Müller, L. K., et al., "Multifunctional poly(phosphoester)s with two orthogonal protective groups" RSC advances, 2015, vol. 5, No. 53, pp. 42881-42888.
Johnston, K. F., et al., "Synthesis of vinyloxy phosphorus monomers from the enolate of acetaldehyde" Polymer bulletin, 2000, vol. 45, pp. 359-364.

*Primary Examiner* — Golam M Shameem
(74) *Attorney, Agent, or Firm* — SZDC Law PC

(57) ABSTRACT

The present invention relates to a method of preparing an asymmetric phosphate-based compound. According to the method of the present invention, since a thiolane-based cyclic compound is used alone in a hydrophobic solvent under a base-free condition, the yield of a desired compound may be increased due to excellent reaction stability and reduced side reactions.

13 Claims, No Drawings

METHOD OF PREPARING ASYMMETRIC PHOSPHATE-BASED COMPOUND

This application is the National Stage Application of PCT/KR2022/015817, filed on Oct. 18, 2022, which claims priority to Korean Patent Application No. 10-2021-0144222, filed on Oct. 27, 2021, which is incorporated by reference for all purposes as if fully set forth herein.

TECHNICAL FIELD

The present invention relates to a method of preparing an asymmetric phosphate-based compound. More particularly, the present invention relates to a method of preparing an asymmetric phosphate-based compound that allows for easy reaction purification, has excellent reaction stability, and allows for an increase in the yield of a desired product due to reduced side reactions in synthesizing the desired asymmetric phosphate-based compound using a hyproxy-type compound as a starting material.

BACKGROUND ART

When a phosphate-based compound obtained using a cyclic compound (cyclic P—X, also called hyproxy type) as a starting material is subjected to hydrogen halide removal reaction (dehydrohalogen), a cyclic compound different from the hyproxy type may bind to the phosphate-based compound. For example, through oxygen as a medium, a different hyproxy type and a different cyclic compound can form an asymmetric phosphate-based compound with a P—O—C structure as the skeleton.

The resulting asymmetric phosphate-based compound is used as a versatile functional material such as an electrolyte solution for lithium-ion batteries in industrial processes.

Accordingly, methods of efficiently synthesizing an asymmetric phosphate-based compound with high yield are being actively studied. For example, there is a known technology for preparing an asymmetric phosphate-based compound through a hydrogen halide removal reaction using a hyproxy-type halogen compound as a starting material, and using a base ($C_3H_9N$, $C_6H_{15}N$) as a reagent for removing hydrogen halides generated during the reaction.

The base used as the hydrogen halide removal reagent generates a hydrochlorite-based solid substance as a by-product after the reaction, so the base remains even after purification. When a water washing process is used to remove these salts, decomposition or ring opening occurs due to the high water reactivity of the resulting asymmetric phosphate-based compound, thereby reducing purity and yield.

Therefore, there is still a need to develop technology suitable for mass production of asymmetric phosphorus compounds.

RELATED ART DOCUMENTS

Patent Documents (Patent Document 1) U.S. Pat. No. 9,246,187

DISCLOSURE

Technical Problem

Therefore, the present invention has been made in view of the above problems, and it is one object of the present invention to provide a method of preparing an asymmetric phosphate-based compound that allows for easy reaction purification, has excellent reaction stability, and allows for an increase in the yield of a desired product due to reduced side reactions in synthesizing the desired asymmetric phosphate-based compound using a hyproxy type compound as a starting material.

The above and other objects can be accomplished by the present invention described below.

Technical Solution

In accordance with one aspect of the present invention, provided is a method of preparing an asymmetric phosphate-based compound, the method including:

synthesizing a compound represented by Chemical Formula 2 below by reacting a cyclic compound represented by Chemical Formula 1 below with a thiolane-based cyclic compound in a hydrophobic solvent under a base-free condition, wherein the reaction is performed at −20 to 20° C. under an inert atmosphere.

[Chemical Formula 1]

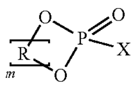

[Chemical Formula 2]

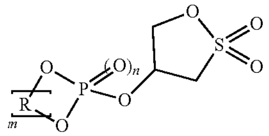

In Chemical Formulas 1 and 2, R is a substituted or unsubstituted alkylene having 1 to 3 carbon atoms, substitution is independently selected from a halogen, a hydroxyl group, an alkyl group having 1 to 8 carbon atoms, a heteroalkyl group having 3 to 6 carbon atoms, a ketone group, a vinyl group having 1 to 5 carbon atoms, or an aryl group having 6 to 10 carbon atoms, the alkyl group, heteroalkyl group, and aryl group are independently substituted with a halogen, X is chlorine (Cl), bromine (Br), fluorine (F), or iodine (I), n is an integer from 0 to 1, and m is an integer from 1 to 5 (When n is 0, the phosphorus (P) atom has an unshared electron pair instead of oxygen).

Based on 100 parts by weight of the cyclic compound represented by Chemical Formula 1, the thiolane-based cyclic compound may be added in an amount of 85 to 300 parts by weight.

The cyclic compound represented by Chemical Formula 1 may be added dropwise at a temperature of −10 to 10° C.

The hydrophobic solvent may include one or more selected from tetrahydrofuran, dioxane, ethyl acetate, methyl acetate, acetonitrile, methyl ethyl ketone, acetone, isobutyl methyl ketone, cyclic ethers, cyclic esters, and cyclic ketones.

The hydrophobic solvent from which moisture has been removed may be added.

Based on 100 parts by weight of the cyclic compound represented by Chemical Formula 1, the hydrophobic solvent may be added in an amount of 50 parts by weight or more.

The reaction may include preparing a reactant solution by mixing the hydrophobic solvent and the cyclic compound represented by Chemical Formula 1; adding the hydrophobic solvent and the thiolane-based cyclic compound under an inert atmosphere and cooling to −20 to 20° C.; and adding the reactant solution dropwise under an inert atmosphere while maintaining the cooling temperature, and then performing stirring while increasing the temperature to room temperature to remove hydrogen halide and perform condensation.

The reaction may further include performing recrystallization for purification under an inert atmosphere.

The compound represented by Chemical Formula 2 may include one or more selected from the group consisting of compounds represented by Chemical Formulas 2-1 to 2-22 below.

[Chemical Formulas 2-1 to 2-10]

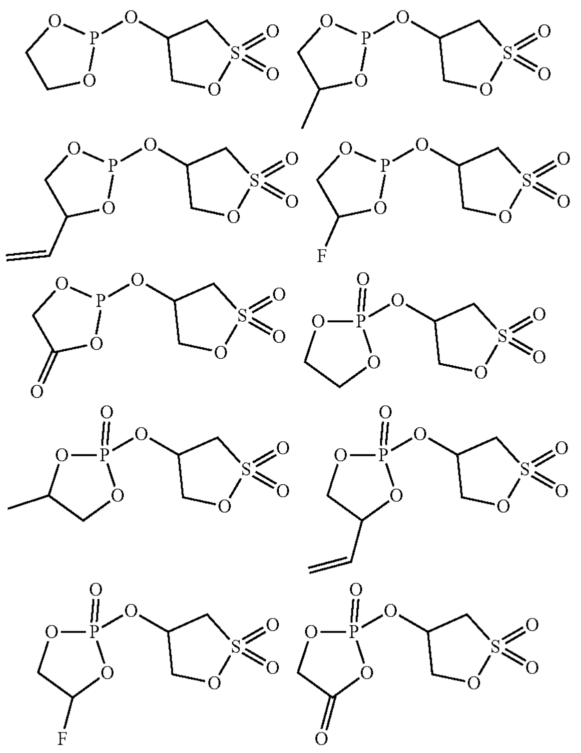

[Chemical Formulas 2-11 to 2-22]

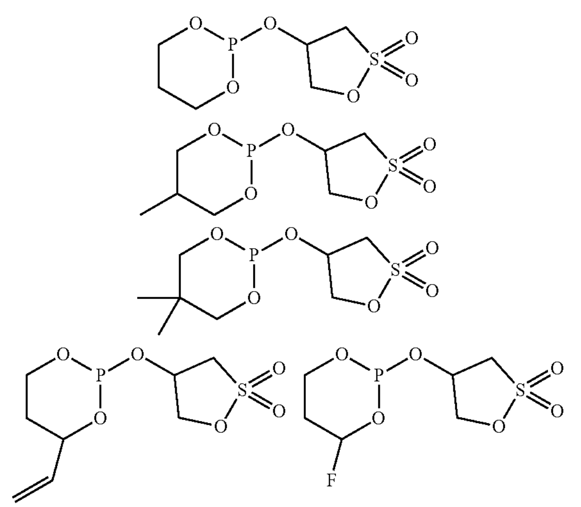

-continued

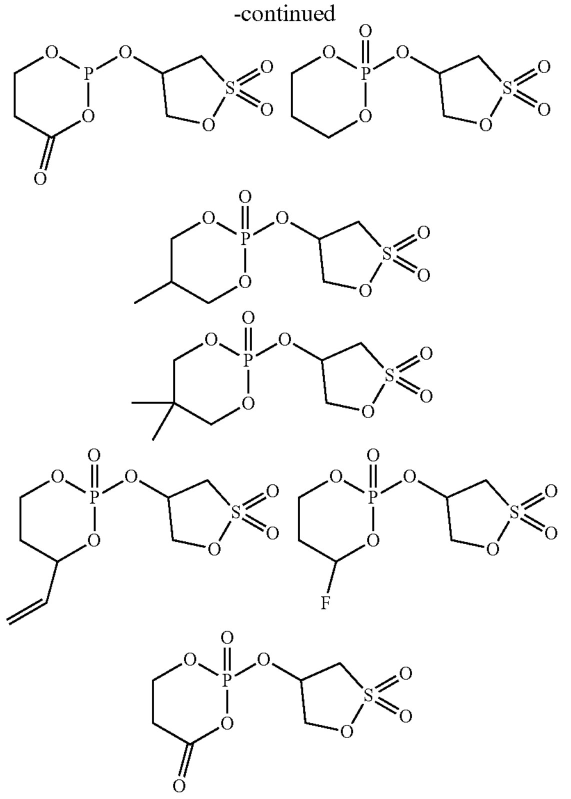

The reaction yield may be 80 or more, and a purity of the compound represented by Chemical Formula 2 may be 90 or more.

The cyclic compound represented by Chemical Formula 1 may be obtained by reacting phosphorus trichloride and ethylene glycol in a hydrophobic solvent having a boiling point lower than that of the hydrophobic solvent.

The cyclic compound represented by Chemical Formula 1 may be obtained by oxidizing, in a hydrophobic solvent having a boiling point higher than that of the hydrophobic solvent, a halo hyproxy-based compound obtained by reacting phosphorus trichloride and ethylene glycol in a hydrophobic solvent having a boiling point lower than that of the hydrophobic solvent.

Advantageous Effects

According to the present invention, when synthesizing a desired asymmetric phosphate-based compound using a hyproxy-type compound using a starting material, since a hydrogen halide removal reagent is not used, purification can be easily performed without dehydration post-processing.

In addition, according to the present invention, since reaction control is easy and side reactions are reduced, an asymmetric phosphate-based compound with high yield of the desired compound can be prepared.

BEST MODE

Hereinafter, a method of preparing an asymmetric phosphate-based compound according to the present invention is described in detail.

The present inventors confirmed that, when synthesizing a desired asymmetric phosphate-based compound using a hyproxy-type compound as a starting material, when a thiolane-based cyclic compound was used under base-free inert conditions, a hydrophobic solvent was used, and reaction temperature was controlled, the yield of a desired product was increased due to excellent reaction stability and reduced side reactions. Based on these results, the present inventors conducted further studies to complete the present invention.

As used in the present invention, the term “alkyl” includes straight-chain, branched-chain, or cyclic hydrocarbon radicals, and the term “alkylene” refers to a divalent radical derived from alkyl. For example, the alkylene includes methylene, ethylene, isobutylene, cyclohexylene, cyclopentylethylene, 2-propenylene, 3-butynylene, and the like.

As used in the present invention, the term “heteroalkyl group” refers to a linear or branched chain group consisting of 3 to 6 carbon atoms and 1 to 3 heteroatoms selected from the group consisting of O, N, P, Si, and S, and the nitrogen, sulfur, and phosphorus atoms may be selectively oxidized. The heteroatom(s) O, N, P, and S may be located at any internal position of the heteroalkyl group. The heteroatom Si may be located at any position of the heteroalkyl group, including the position where an alkyl group is attached to the rest of a molecule.

As used in the present invention, in the expression “substituted or unsubstituted”, “substitution” means that one or more hydrogen atoms in a hydrocarbon are each independently replaced with the same or different substituents.

In this case, a commonly used substituent may be used, and for example, the substituent is selected from among halo, alkyl, aryl, and arylalkyl.

As used in the present invention, the term “inert atmosphere” refers to nitrogen, helium, or argon atmosphere.

For example, the method of preparing an asymmetric phosphate-based compound according to the present invention includes a step of synthesizing a compound represented by Chemical Formula 2 below by reacting a cyclic compound represented by Chemical Formula 1 below with a thiolane-based cyclic compound in a hydrophobic solvent under a base-free condition, wherein the reaction is performed at −20 to 20° C. under inert atmosphere. In this case, reaction stability may be excellent and side reactions may be reduced, thereby increasing yield.

Hereinafter, each of components required for preparing an asymmetric phosphate-based compound of the present invention will be described in detail.

Starting Material

In the present disclosure, for example, as starting materials used in a hydrogen halide removal reaction, a cyclic compound represented by Chemical Formula 1 below and a thiolane-based cyclic compound to be described later may be used.

[Chemical Formula 1]

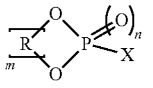

In Chemical Formula 1, R may be a substituted or unsubstituted alkylene having 1 to 3 carbon atoms, substitution may independently be selected from a halogen, a hydroxyl group, an alkyl group having 1 to 8 carbon atoms, a heteroalkyl group having 3 to 6 carbon atoms, a ketone group, a vinyl group having 1 to 5 carbon atoms, or an aryl group having 6 to 10 carbon atoms, and the alkyl group, heteroalkyl group, and aryl group may be independently substituted with a halogen.

n is an integer from 0 to 1. When n is 0, the phosphorus (P) atom has an unshared electron pair instead of oxygen.

m is an integer from 1 to 5.

In Chemical Formula 1, for example, when X is chlorine (Cl), n may be 0, m may be 1, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 0, m may be 2, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 0, m may be 3, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 0, m may be 4, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 0, m may be 5, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 1, m may be 1, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 1, m may be 2, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 1, m may be 3, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 1, m may be 4, and R may be substituted or unsubstituted methylene. Here, substitution may be performed with a methyl group, an ethyl group, a fluoro group, a ketone group, or a vinyl group.

In Chemical Formula 1, for example, when X is chlorine (Cl), n may be 1, m may be 5, and R may be substituted or unsubstituted methylene. Here, substitution may be performed with a methyl group, an ethyl group, a fluoro group, a ketone group, or a vinyl group.

As a specific example, the cyclic compound represented by Chemical Formula 1 may include compounds represented by Chemical Formulas 1-1 to 1-22 below.

[Chemical Formulas 1-1 to 1-10]

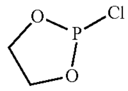
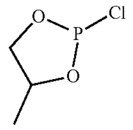
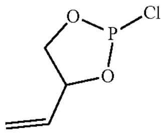
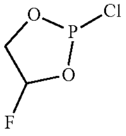

-continued

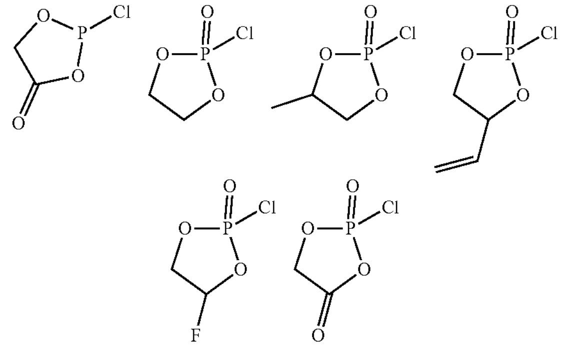

[Chemical Formulas 1-11 to 1-22]

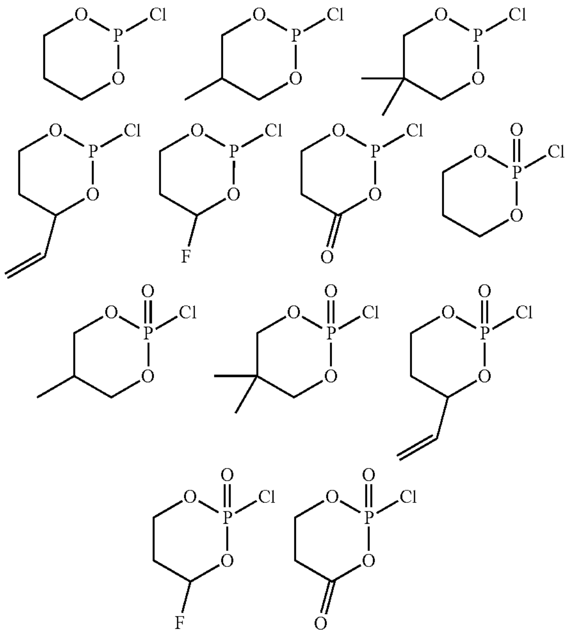

For example, the thiolane-based cyclic compound may be 4-hydroxy-1,2-oxathiolane-2,2-dioxide.

4-hydroxy-1,2-oxathiolane-2,2-dioxide material may be prepared according to a known method or a commercially available product may be used. For example, a compound prepared by Reaction Formula 1 below may be used.

[Reaction Formula 1]

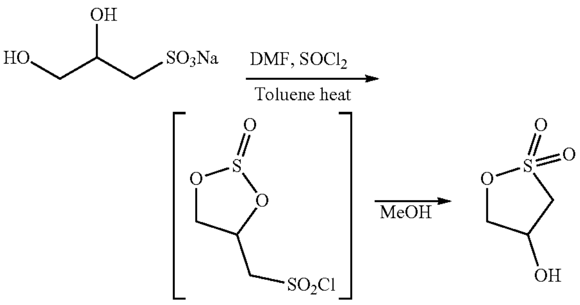

Product

In the present disclosure, for example, a product obtained by subjecting the cyclic compound represented by Chemical Formula 1 to a hydrogen halide removal reaction to be describe later may be a compound represented by Chemical Formula 2 below.

[Chemical Formula 2]

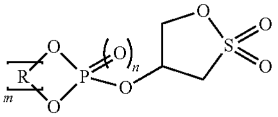

In Chemical Formula 2, R may be a substituted or unsubstituted alkylene having 1 to 3 carbon atoms, substitution may be independently selected from a halogen, a hydroxyl group, an alkyl group having 1 to 8 carbon atoms, a heteroalkyl group having 3 to 6 carbon atoms, a ketone group, a vinyl group having 1 to 5 carbon atoms, or an aryl group having 6 to 10 carbon atoms, and the alkyl group, heteroalkyl group, and aryl group may be independently substituted with a halogen.

n is an integer from 0 to 1. When n is 0, the phosphorus (P) atom has an unshared electron pair instead of oxygen.

m is an integer from 1 to 5.

In Chemical Formula 2, n may be 0, m may be 1, and R may be substituted or unsubstituted methylene. Here, substitution may be performed with a methyl group, an ethyl group, a fluoro group, a ketone group, or a vinyl group.

In Chemical Formula 2, n may be 0, m may be 2, and R may be substituted or unsubstituted methylene. Here, substitution may be performed with a methyl group, an ethyl group, a fluoro group, a ketone group, or a vinyl group.

In Chemical Formula 2, n may be 0, m may be 3, and R may be substituted or unsubstituted methylene. Here, substitution may be performed with a methyl group, an ethyl group, a fluoro group, a ketone group, or a vinyl group.

In Chemical Formula 2, n may be 0, m may be 4, and R may be substituted or unsubstituted methylene. Here, substitution may be performed with a methyl group, an ethyl group, a fluoro group, a ketone group, or a vinyl group.

In Chemical Formula 2, n may be 0, m may be 5, and R may be substituted or unsubstituted methylene. Here, substitution may be performed with a methyl group, an ethyl group, a fluoro group, a ketone group, or a vinyl group.

In Chemical Formula 2, n may be 1, m may be 1, and R may be substituted or unsubstituted methylene. Here, substitution may be performed with a methyl group, an ethyl group, a fluoro group, a ketone group, or a vinyl group.

In Chemical Formula 2, n may be 1, m may be 2, and R may be substituted or unsubstituted methylene. Here, substitution may be performed with a methyl group, an ethyl group, a fluoro group, a ketone group, or a vinyl group.

In Chemical Formula 2, n may be 1, m may be 3, and R may be substituted or unsubstituted methylene. Here, substitution may be performed with a methyl group, an ethyl group, a fluoro group, a ketone group, or a vinyl group.

In Chemical Formula 2, n may be 1, m may be 4, and R may be substituted or unsubstituted methylene. Here, substitution may be performed with a methyl group, an ethyl group, a fluoro group, a ketone group, or a vinyl group.

In Chemical Formula 2, n may be 1, m may be 5, and R may be substituted or unsubstituted methylene. Here, substitution may be performed with a methyl group, an ethyl group, a fluoro group, a ketone group, or a vinyl group.

As a specific example, the compound represented by Chemical Formula 2 may include one or more selected from the group consisting of compounds represented by Chemical Formulas 2-1 to 2-22 below.

[Chemical Formulas 2-1 to 2-10]

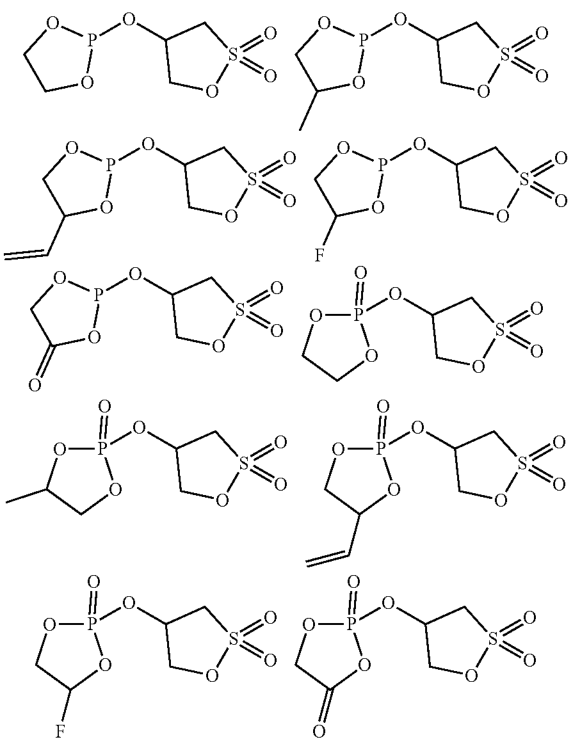

[Chemical Formulas 2-11 to 2-22]

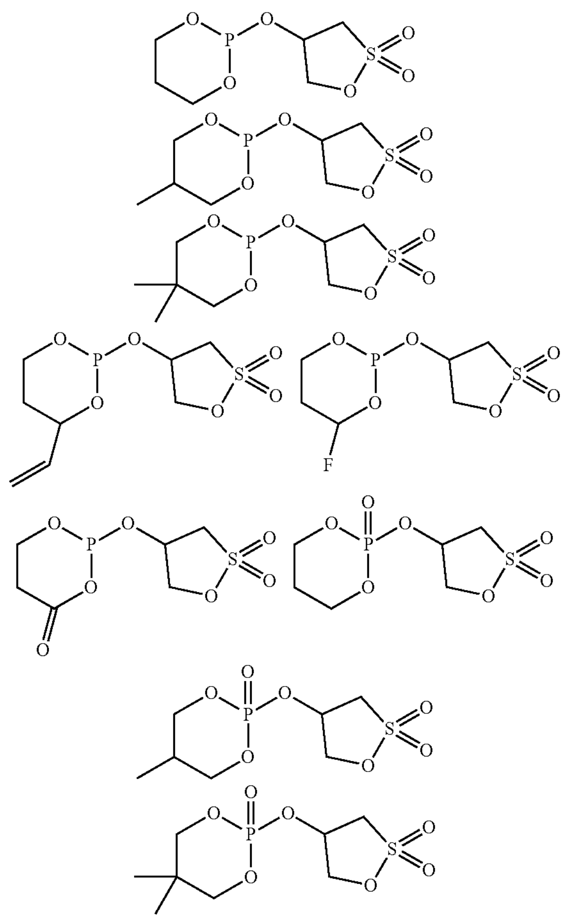

-continued

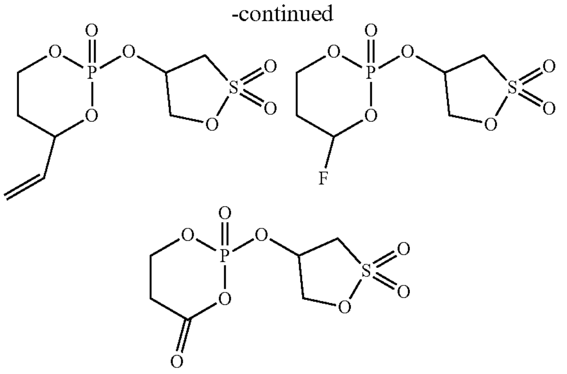

Hydrogen Halide Removal Reaction

The purpose of the preparation method according to the present invention is to obtain the compound represented by Chemical Formula 2 by a hydrogen halide removal reaction using the cyclic compound represented by Chemical Formula 1 as a starting material.

The hydrogen halide removal reaction is preferably performed as a one-step reaction shown in Reaction Formula 2 below.

[Reaction Formula 2]

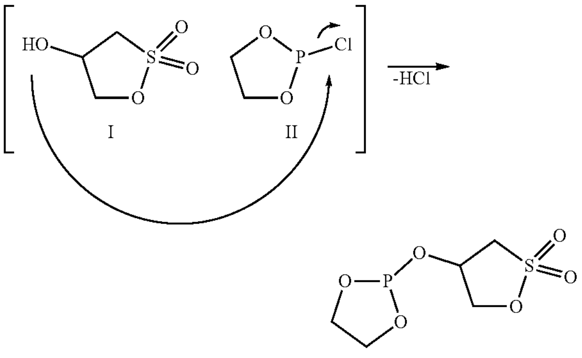

I II III

As shown in Reaction Formula 2, starting material I (the thiolane-based cyclic compound) attacks the halogen terminal portion of starting material II (corresponding to the cyclic compound represented by Chemical Formula 1) under an inert atmosphere in a base-free state to generate hydrochloric acid and obtain desired product III (corresponding to the compound represented by Chemical Formula 2). Through this mechanism, reaction time may be reduced, reaction yield may be increased without side reactions, and reaction stability may be provided.

As shown in Reaction Formula 2, the hydrogen halide removal reaction of the present invention is performed under base-free reaction conditions while using starting material I and starting material II without using a conventional hydrogen halide removal reagent that generates solid by-products. Thus, reaction stability may be excellent, and yield may be increased due to reduced side reactions.

Hereinafter, a solvent and the like required in the hydrogen halide removal reaction shown in Reaction Formula 2 will be described, and the specific conditions of the hydrogen halide removal reaction will be described.

Solvent for Hydrogen Halide Removal Reaction

A solvent effect is very important in organic reactions including the aforementioned hydrogen halide removal reaction, and reaction progress and yield may be greatly affected by the type of solvent. Accordingly, in the method of preparing an asymmetric phosphate-based compound according to the present invention, selection of a solvent is very important.

The solvent must be able to dissolve starting material I (the cyclic compound represented by Chemical Formula 1). Accordingly, a hydrophobic solvent is preferably used. Since the reaction may be terminated without generating dimers in desired product II of Reaction Formula 1 described above, to sufficiently generate dimers and improve production efficiency, a solvent that has excellent miscibility with starting material II and a melting point below zero is preferably used.

A hydrophobic solvent that satisfies these characteristics may include one or more selected from tetrahydrofuran, dioxane, ethyl acetate, methyl acetate, acetonitrile, methyl ethyl ketone, acetone, isobutyl methyl ketone, cyclic ethers, cyclic esters, and cyclic ketones.

In addition, it is preferable to use the above-mentioned organic solvent in a dry state after removing moisture therefrom rather than using the organic solvent in an intact state when considering precise reaction control.

For example, based on 100 parts by weight of the cyclic compound represented by Chemical Formula 1, the hydrophobic solvent may be used in an amount of 50 parts by weight or more, preferably 50 to 2,000 parts by weight. Within this range, reaction conversion rate and purity may be optimized.

Starting Material Content

The thiolane-based cyclic compound as the starting material that performs the hydrogen halide removal reaction in the present invention allows one-stop removal of hydrochloric acid from the starting material in a suitable organic solvent according to the mechanism of Reaction Formula 1. Accordingly, since water and a hydrogen halide removal reagent are not used, the volume ratio does not increase, and thus production efficiency may be increased. Also, the purity and yield of a product may be increased. In addition, since the process of separating by-products from water is omitted, the above mechanism may be suitably applied to a mass production process.

That is, according to the present invention, the thiolane-based cyclic compound allows easy reaction control and provides electron-donating reactivity with the starting material, allowing the synthesis of an asymmetric phosphate-based compound in a high yield under specific temperature and specific atmosphere conditions described below.

For example, based on 100 parts by weight of the cyclic compound represented by Chemical Formula 1, the thiolane-based cyclic compound may be added in an amount of 85 to 330 parts by weight, preferably 105 to 165 parts by weight, more preferably 105 to 135 parts by weight. In this case, reaction conversion rate and reaction may be optimized.

Hydrogen Halide Removal Reagent

When a separate removal reagent such as a base is used in the hydrogen halide removal reaction, solid by-products are formed. It is difficult to separate the solid by-products from the desired product. Reaction efficiency may be improved by controlling reaction conditions described later. Accordingly, in the present invention, as shown in Reaction Formula 1, a hydrogen halide removal reagent is not used.

Conditions and Time-Dependent Change of Hydrogen Halide Removal Reaction

To efficiently perform the hydrogen halide removal reaction without using the aforementioned hydrogen halide removal reagent, in the present invention, the hydrogen halide removal reaction is performed under an inert atmosphere.

Maintaining this inert atmosphere from the time a material for hydrogen halide removal reaction is introduced to the end of the reaction and further to the purification stage may increase the purity and yield of a product. In addition, the process of extracting using water, removing water, or removing hydrogen halide may be omitted, making it suitable for use in a mass production process.

That is, according to the present invention, the inert atmosphere facilitates the control of the hydrogen halide removal reaction, providing the effect of synthesizing an asymmetric phosphate-based compound in high yield.

For example, the pH of the hydrogen halide removal reaction may be 4 to 8, preferably 6 to 7, more preferably 6.5 to 7. In this case, reaction efficiency may be improved.

For example, the hydrogen halide removal reaction temperature may be −20 to 20° C., preferably −10 to 20° C. In this case, the starting material may be sufficiently dissolved in hydrophobic solvent. In addition, even after adding the starting material, the hydrogen halide removal reaction may be effectively performed at room temperature.

For example, the hydrogen halide removal reaction time may be 12 hours or less, preferably 3 hours or less, more preferably 2 to 3 hours.

In addition, for example, the dropping temperature of the starting material may be −20 to 0° C., preferably −10 to 0° C. Within this range, reaction stability may be imparted.

At this time, it is appropriate for pilot and mass production applications to add the solvent and the thiolane-based cyclic compound prior to adding the starting material dropwise and then cool to the aforementioned temperature range.

At this time, the dropping time of the starting material is not particularly limited as long as the aforementioned dropping temperature is maintained, but for example, the dropping time may be 1 hour or more, preferably 2 to 3 hours.

In addition, considering reaction stability, it is desirable to ensure that the internal temperature does not exceed 3° C. during dropwise addition.

For example, the method of preparing an asymmetric phosphate-based compound according to the present invention includes a step of preparing a reactant solution by mixing the hydrophobic solvent and the cyclic compound represented by Chemical Formula 1; a step of adding the hydrophobic solvent and the second cyclic compound under an inert atmosphere and cooling to −20 to 0° C.; and a step of adding the reactant solution dropwise under an inert atmosphere while maintaining the cooling temperature, and then performing stirring while increasing the temperature to room temperature to remove hydrogen halide and perform condensation. In this case, reaction stability may be excellent, and yield may be increased due to reduced side reactions.

According to the present invention, the process of removing hydrochloric acid generated during the reaction under base-free reaction conditions under an inert atmosphere is omitted.

In addition, according to the method of preparing an asymmetric phosphate-based compound according to the present invention, for example, the purity of the compound represented by Chemical Formula 2 may be 90% or more, preferably 96% or more.

In addition, according to the method of preparing an asymmetric phosphate-based compound according to the present invention, for example, the yield of the compound represented by Chemical Formula 2 may be 80% or more, preferably 85% or more.

In the present disclosure, the yield is a value obtained by multiplying the mole of 100% stoichiometric reaction of the starting material by 100 based on the mole of the actually obtained product.

According to the method of preparing an asymmetric phosphate-based compound according to the present invention, the reaction may further include a step of performing concentration under reduced pressure to remove the organic solvent.

In addition, the reaction may further include a step of performing recrystallization for purification.

The recrystallization involves dissolving a product, specifically a depressurization concentrate, in an organic solvent including dichloromethane, then filtering to remove suspended solids, and concentrating the filtrate under reduced pressure.

At this time, it is desirable to perform precision filtration using a celite filter to obtain a high-purity product.

In addition, according to the preparation method of the present invention, as described above, since the product is obtained in 100% purity or high purity and does not contain insoluble impurities, the reaction may be completed without post-processes such as filtration and purification.

The cyclic compound represented by Chemical Formula 1 may be obtained by reacting phosphorus trichloride and ethylene glycol in a hydrophobic solvent having a boiling point lower than that of the hydrophobic solvent, but the present invention is not limited thereto.

The related reaction mechanism may be expressed as Reaction Formula 3 below.

[Reaction Formula 3]

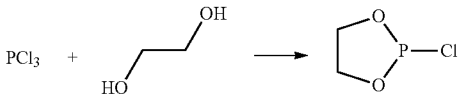

1

Specifically, the hydrophobic solvent may be dichloromethane or chloroform.

The reaction may be performed at room temperature for 0.5 to 5 hours.

Then, the solvent may be removed by depressurization and distillation, and purification may be performed to obtain the cyclic product (corresponding to compound 1 of Reaction Formula 2).

For example, the purification may be performed at 72 to 78° C. and 65 to 67 mbar.

In addition, the cyclic compound represented by Chemical Formula 1 may be obtained by oxidizing the halo hyproxy-based compound (corresponding to compound 1 of Reaction Formula 2) in a hydrophobic solvent having a boiling point higher than that of the hydrophobic solvent.

Specifically, the hydrophobic solvent may be benzene or the like.

The oxidation reaction may be performed within a temperature range above room temperature and below the boiling point of the solvent, and the reaction temperature may be set higher than room temperature to minimize reaction time.

In addition, for example, the oxidation reaction may be performed for 12 hours or more, as a specific example, 24 to 84 hours.

Then, the solvent may be removed by depressurization and distillation, and purification may be performed to obtain a colorless product.

At this time, the colorless product may be compound 1 of Reaction Formula 2.

For example, the purification may be performed at 66 to 74° C. and 0.13 to 0.15 mbar.

Accordingly, when performing cyclization and hydrogen halide removal reactions using phosphorus trichloride as the initial starting material, the reaction mechanism may be represented by Reaction Formula 4 below.

[Reaction Formula 4]

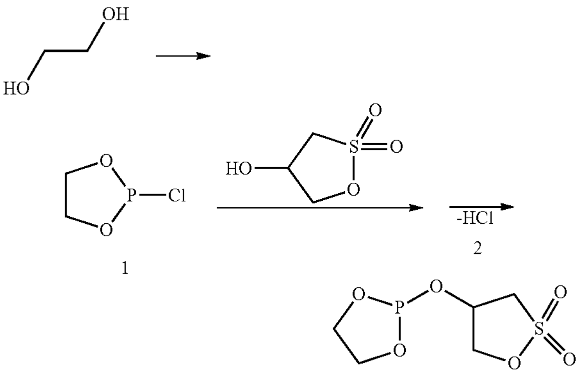

1

2

III

In addition, when performing cyclization, oxidation, and hydrogen halide removal reactions using phosphorus trichloride as the initial starting material, the reaction mechanism may be represented by Reaction Formula 5 below.

[Reaction Formula 5]

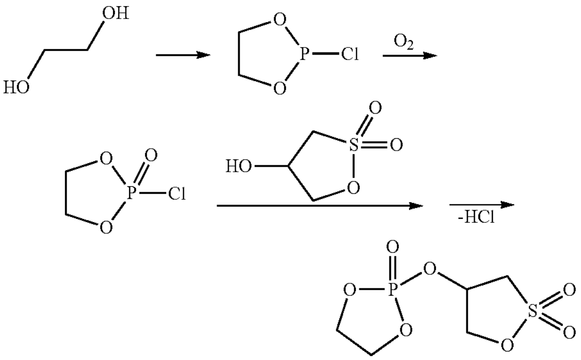

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Preparation Example 1: Preparation of 2-chloro-1,3,2-dioxaphospholane

Cyclization reaction was performed according to Reaction Formula 4, and 2-chloro-1,3,2-dioxaphospholane (corresponding to compound 1 of Reaction Formula 4) was prepared using phosphorus trichloride. At this time, dichloromethane, phosphorus trichloride, and ethylene glycol required for the reaction were purchased from Sigma Aldrich.

Specifically, using a frame-dried 500 mL round-bottom flask with a reflux system and a NaOH neutralizer, 137.3 g (1.000 mol) of phosphorus trichloride was diluted in 150 ml of anhydrous dichloromethane, and then 60.07 g (1.000 mol) of ethylene glycol was added dropwise thereto.

After reacting at room temperature for 2 hours, the solvent was removed by depressurization and distillation, and then purification was performed at 72 to 78° C. and 65 to 67 mbar to obtain 84 g of a cyclic product corresponding to compound 1 of Reaction Formula 4. At this time, the yield was 67%.

$^{1}$H NMR (500 MHZ, $CDCl_3$): 4.52-4.22 (m, 4H, O—CH2-CH2-O)

$^{13}$C NMR (176 MHZ, $CDCl_3$): 65.29

$^{31}$P MR (283 MHZ, $CDCl_3$): 167.80

Preparation Example 2: Preparation of 2-chloro-2-oxo-1,3,2-dioxaphospholane

An oxidation reaction was performed using 2-chloro-1,3,2-dioxaphospholane (corresponding to compound 1 of Reaction Formula 4) obtained in Preparation Example 1 to prepare 2-chloro-2-oxo-1,3,2-dioxaphospholane (corresponding to Compound 2 of Reaction Formula 4).

Specifically, using a frame-dried 500 mL 3-neck flask with a reflux system, 20.0 g of the product obtained in Preparation Example 1 was diluted in 150 ml of benzene, and then stirring was performed at room temperature for 24 hours while passing oxygen.

After the reaction, the solvent was removed by depressurization and distillation, and purification was performed at 66 to 74° C. and 0.13 to 0.15 mbar to obtain 15.82 g of a colorless product corresponding to Compound 2 of Reaction Formula 4 (X═Cl, R=methylene, n=2,2-chloro-2-oxo-1,3,2-dioxaphospholane). At this time, the yield was 70%.

$^{1}$H NMR (500 MHZ, $CDCl_3$): 4.64-4.44 (m, 4H, O—CH2-CH2-O)

$^{13}$C NMR (176 MHz, $CDCl_3$): 66.54

$^{31}$P NMR (121 MHZ, $CDCl_3$): 168.85

Preparation Example 3: Preparation of 2,3-sodium dihydroxypropane sulfonate

[Reaction Formula 1a]

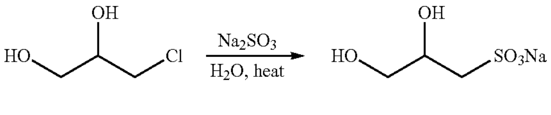

120 g (924 mmol) of sodium sulfite was dissolved in 400 ml of water, and 107.2 g (970 mmol) of 3-chloro-1,2-propanediol was added to the resulting solution and was subjected to heating reflux for 1 hour. After the reaction was completed, the reaction solution was concentrated, and 750 ml of methanol was added to the concentrated residue to generate crystals. The resulting crystals were then filtered and dried to obtain 215 g of white crystals of 2,3-sodium dihydroxypropane sulfonate (content: 70%, yield: 80%). The content of 2,3-sodium dihydroxypropane sulfonate was determined by the internal standard method using NMR. It was confirmed that crystals of sodium chloride, a by-product, were mixed among the crystals.

Preparation Example 4: Preparation of 4-hydroxy-1,2-oxathiolane-2,2-dioxide

[Reaction Formula 1]

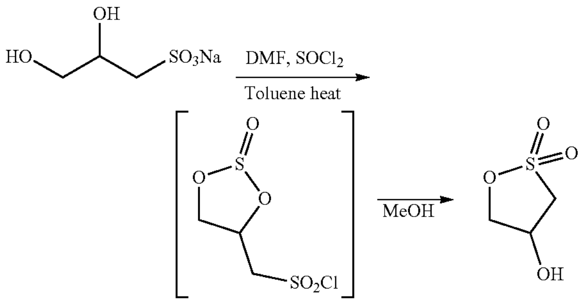

40 g (164 mmol, content: 70%) of 2,3-sodium dihydroxypropane sulfonate obtained in Preparation Example 3 was suspended in 100 ml of toluene, 0.06 g (8.23 mmol) of N, N-dimethylformamide was added thereto, and then 50.85 g (492 mmol) of thionyl chloride was slowly added thereto dropwise. Then, reaction was performed by heating and stirring the reaction solution at 65° C. for 7 hours. Afterwards, the reaction solution was cooled to room temperature, 26.3 g (820 mmol) of methanol was added to the cooled solution, and the mixture was stirred at room temperature for 2 hours to react. After the reaction was completed, the reaction solution was concentrated, 375 ml of ethyl acetate and 150 ml of water were added to the resulting residue, the mixture was stirred, and an organic layer was separated. After concentrating the obtained organic layer, chloroform was added to the concentrated residue to produce crystals. The resulting crystals were filtered and dried to obtain 15.2 g (yield: 70%) of white crystals of 4-hydroxy-1,2-oxathiolane-2,2-dioxide.

Example 1

Using 2-chloro-1,3,2-dioxaphospholane obtained in Preparation Example 1 and 4-hydroxy-1,2-oxathiolane-2,2-dioxide obtained in Preparation Example 4, hydrogen halide removal reaction was performed according to Reaction Formula 1 or 3 to prepare a compound represented by Chemical Formula 2-1 below that is the compound represented by Chemical Formula 2 (corresponding to the compound represented as II of Reaction Formula 1 or III of Reaction Formula 3; R=methylene, n=0, m=2).

[Chemical Formula 2-1]

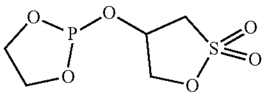

Specifically, as a first step, a thermometer was installed in a dry 250 ml Schlenk flask, and 100 ml of tetrahydrofuran dried in a nitrogen environment and 15 g (108.58 mmol) of synthesized 4-hydroxy-1,2-oxathiolane-2,2-dioxide were added thereto and cooled to 0° C.

Then, as a second step, a mixture containing 14.4 g (114.01 mmol) of 2-chloro-2-oxo-1,3,2-dioxaphospholane purchased from Sigma Aldrich and 50 ml of dried tetrahydrofuran was added thereto dropwise while maintaining the temperature. Then, the temperature was increased to room temperature, and the mixture was stirred for 2 hours.

Next, as a third step, the solvent was removed by concentration under reduced pressure, and then 30 ml of dichloromethane was added to perform dissolution. Next, suspended matter was removed through Celite filtration, and the filtrate was concentrated under reduced pressure and filtered to obtain 21.1 g of a solid product. Then, the solid product was subjected to vacuum drying, and the yield thereof was measured. At this time, the yield of the product was 85%.

As a result of 1H NMR spectrum analysis for the compound, the O—$CH_2$—$CH_2$—O group was observed at 4.54 to 4.50 ppm. The $^{13}C$ NMR and $^{31}P$ NMR results are as follows. In addition, the purity of the product measured by gas chromatography was 99.1%.

$^1H$ NMR (500 MHZ, $CDCl_3$): 5.11 (dd, 1H, O—CH—$CH_2$), 4.51-(dd, 1H, O—CH—$CH_2$), 4.32 (dd, 1H, O—CH—$CH_2$), 4.17-3.98 (m, 2H, O—$CH_2$—$CH_2$—O), 3.50 (dd, 1H, CH—$CH_2$—S), 3.35 (dd, 1H, CH—$CH_2$—S)

$^{13}C$ NMR (176 MHZ, $CDCl_3$): 68.3, 68.2, 64.9, 64.8, 61.4

$^{31}P$ NMR (121 MHZ, $CDCl_3$): 60

Examples 2 to 13

The same process as Example 1 was performed except that, instead of 2-chloro-1,3,2-dioxaphospholane used in Example 1, starting materials shown in Table 1 below were used. As a result, the yields and 1H NMR data of the products are as follows.

TABLE 1

| Example No. | Starting material | Yield (wt %) | Product | $^1H$ NMR data (500 MHz) |
|---|---|---|---|---|
| 2 | [Chemical Formula 1-3] 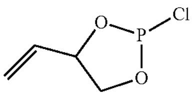 | 82 | [Chemical Formula 2-3] 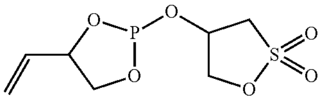 | 5.89 (m, 1H, $CH_2$=CH—CH), 5.28-5.29 (m, 2H, $CH_2$=CH), 5.12 (m, 1H, O—CH—$CH_2$), 4.52 (m, 1H, CH—$CH_2$—O), 4.29 (m, 1 H, CH—$CH_2$—O), 4.27 (d dd, 1H, CH—CH—O), 3.85 (dd, 1H, CH—$CH_2$—O), 3.60 (dd, 1H, CH—$CH_2$—O), 3.46 (dd, 1H, CH—$CH_2$—S), 3.21 (dd, 1H, CH—$CH_2$—S) |
| 3 | [Chemical Formula 1-4] 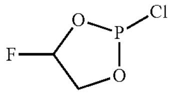 | 80 | [Chemical Formula 2-4] 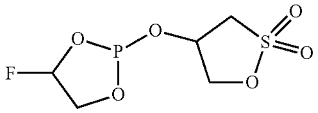 | 5.43 (dd, 1H, F—CH—$CH_2$), 5.15 (m, 1H, O—CH—$CH_2$), 4.52 (dd, 1H, CH—$CH_2$—O), 4.29 (dd, 1H, CH—$CH_2$—O), 4.01 (m, 1H, O—$CH_2$—CH), 3.75 (m, 1H, O—$CH_2$—CH), 3.46 (dd, 1H, CH—$CH_2$—S), 3.21 (dd, 1H, CH—$CH_2$—S) |
| 4 | [Chemical Formula 1-5] 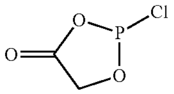 | 85 | [Chemical Formula 2-5] 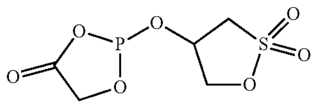 | 5.05 (m, 1H, O—CH—$CH_2$), 4.52 (dd, 1H, CH—$CH_2$—O), 4.47 (m, 1H, O—CH—C(=O)), 4.29 (m, 1H, $CH_2$—CH—O), 3.46 (dd, 1H, CH—$CH_2$—S), 3.21 (dd, 1H, CH—$CH_2$—S) |
| 5 | [Chemical Formula 1-6] 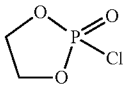 | 80 | [Chemical Formula 2-6] 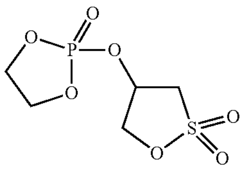 | 5.30 (dd, 1H, CH—$CH_2$—O), 4.54-4.50 (m, 1H, O—CH—$CH_2$), 4.47 (dd, 1H, CH—$CH_2$—O), 4.40-4.35 (m, 4H, O—$CH_2$—$CH_2$—O), 3.65 (dd, 1H, CH—$CH_2$—S), 3.35 (dd, 1H, CH—$CH_2$—S) |

TABLE 1-continued

| Example No. | Starting material | Yield (wt %) | Product | $^1$H NMR data (500 MHz) |
|---|---|---|---|---|
| 6 | [Chemical Formula 1-8] 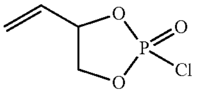 | 81 | [Chemical Formula 2-8] 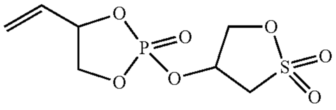 | 5.89 (m, 1H, CH—CH=$CH_2$), 5.32 (m, 1H, O—CH—$CH_2$), 5.28 (dd, 2H, $CH_2$=CH), 4.72 (d d, 1H, CH—$CH_2$—O), 4.52 (m, 1H, CH—$CH_2$—O), 4.47 (dd, 1H, CH—$CH_2$—O), 4.28 (m, 2H, O—CH2—CH—O), 3.65 (dd, 1H, CH—$CH_2$—S), 3.40 (dd, 1H, CH—$CH_2$—S) |
| 7 | [Chemical Formula 1-9] 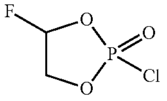 | 80 | [Chemical Formula 2-9] 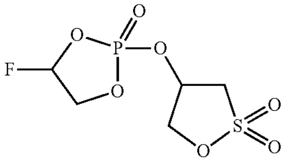 | 5.43 (m, 1H, $CH_2$—CHF—O), 5.35 (m, 1H, O—CH—$CH_2$), 4.70 (dd, 1H, CH—$CH_2$—O) 4.68 (m, 1H, CHF—$CH_2$—O), 4.47 (dd, 1H, CH—$CH_2$—O), 4.40 (m, 1H, CHF—$CH_2$—O), 3.68 (dd, 1H, CH—$CH_2$—S), 3.37 (dd, 1 H, CH—$CH_2$—S) |
| 8 | [Chemical Formula 1-10] 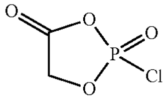 | 82 | [Chemical Formula 2-10] 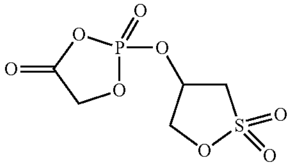 | 5.37 (m, 1H, O—CH—$CH_2$), 4.97 (d, 1H, O—$CH_2$—C(=O)), 4.73 (dd, 1H, CH—$CH_2$—O), 4.52 (dd, 1H, CH—$CH_2$—O), 3.71 (dd, 1H, CH—$CH_2$—S) 3.41 (dd, 1H, CH—$CH_2$—S) |
| 9 | [Chemical Formula 1-11] 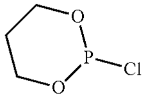 | 86 | [Chemical Formula 2-11] 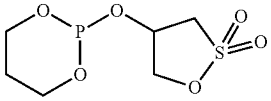 | 5.31 (m, O—CH—$CH_2$), 4.52 (dd, 1H, CH—$CH_2$—O), 4.27 (dd, 1H, CH—$CH_2$—O), 3.54 (ddd, 4H, $CH_2$—$CH_2$—O), 3.47 (dd, 1H, CH—$CH_2$—S), 3.21 (dd, 1H, CH—$CH_2$—S), 1.67 (ddd, 2H, $CH_2$—$CH_2$—$CH_2$) |
| 10 | [Chemical Formula 1-17] 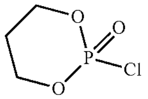 | 83 | [Chemical Formula 2-17] 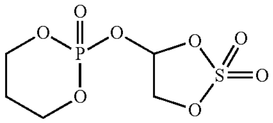 | 5.40 (m, 1H, $CH_2$—CH—O), 4.73 (dd, 1H, CH—$CH_2$—O), 4.45 (dd, 1H, $CH_2$—CH—O), 4.01 (ddd, 4H, $CH_2$—$CH_2$—O), 3.66 (dd, 1H, CH—$CH_2$—S), 3.41 (dd, 1H, CH—$CH_2$—S), 2.03 (ddd, 2H, $CH_2$—$CH_2$—$CH_2$) |
| 11 | [Chemical Formula 1-15] 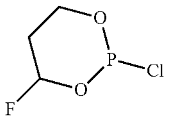 | 82 | [Chemical Formula 2-15] 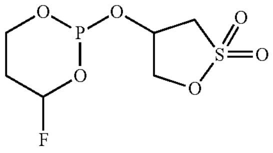 | 5.33 (m, 1H, $CH_2$—CHF—O), 5.30 (m, 1H, O—CH—$CH_2$), 4.60 (dd, 1H, CH—$CH_2$—O), 4.29 (dd, 1H, CH—CH2—O), 3.56-3.48 (m, 2H, O—$CH_2$—$CH_2$), 3.45 (dd, 1H, CH—$CH_2$—S), 3.20 (dd, 1H, CH—$CH_2$—S), 1.96-1.70 (m, 2H, O—$CH_2$—$CH_2$—CH—O) |

TABLE 1-continued

| Example No. | Starting material | Yield (wt %) | Product | $^1$H NMR data (500 MHz) |
|---|---|---|---|---|
| 12 | [Chemical Formula 1-16] 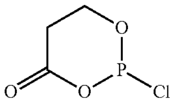 | 87 | [Chemical Formula 2-16] 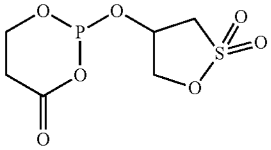 | 5.41 (m, 1H, O—CH—$CH_2$), 4.60 (dd, 1H, CH—$CH_2$—O), 4.28 (dd, 1H, CH—$CH_2$—O), 3.80 (dd, 2H, O—$CH_2$—$CH_2$), 3.47 (dd, 1H, CH—$CH_2$—S), 3.20 (dd, 1H, CH—$CH_2$—S), 2.42 (dd, 2H, $CH_2$—$CH_2$—C(=O)) |
| 13 | [Chemical Formula 1-22] 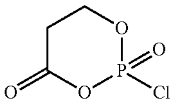 | 85 | [Chemical Formula 2-22] 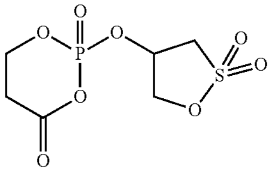 | 5.51 (m, 1H, O—CH—$CH_2$), 4.72 (dd, 1H, CH—$CH_2$—O), 4.47 (dd, 1H, CH—$CH_2$—O), 4.30 (dd, 2H, O—$CH_2$—$CH_2$), 3.63 (dd, 1H, CH—$CH_2$—S), 3.41 (dd, 1H, CH—$CH_2$—S), 2.60 (dd, 2H, $CH_2$—$CH_2$—C(═O)) |

Comparative Example 1

The same process as Example 1 was performed except that 12.1 g (119.44 mmol) of triethylamine was added between the first step and the second step, and dissolution using dichloromethane and removal of suspended matter through Celite filtration in the third step were omitted.

As a result, the yield was 52%, and the purity was 92.5%. When using a base, it was confirmed that a solid by-product of triethylamine hydrochloride was generated and remained even after purification, resulting in a decrease in yield and purity.

Comparative Example 2

The same process as Example 1 was performed except that, instead of tetrahydrofuran, diethyl ether was used. As a result, the solubility of thiolane used as a starting material in diethyl ether was very low, so the yield of the compound represented by Chemical Formula 2-6 was 10% and the purity thereof was 70%. These results show that the reaction did not proceed properly.

Comparative Example 3

The same process as Example 1 was performed except that the first and second steps were not performed under nitrogen environment. As a result, the yield was 5%, and the purity could not be confirmed. When a hydrogen halide removal reagent was not used and inert atmosphere was not applied, hydrogen halide removal efficiency was poor. In addition, it was confirmed that the starting material, 2-chloro-1,3,2-dioxaphospholane, was decomposed to form a polymer, resulting in a decrease in yield and purity.

Comparative Example 4

The same process as Example 1 was performed except that the first and second steps were performed at an increased temperature (20° C.). As a result, the yield was 5%, and the purity could not be confirmed due to polymerization. When the hydrogen halide removal reaction temperature was high, a polymerization reaction occurred. When separating it, it was confirmed that the decrease in yield is greater than the change in purity.

As can be seen from the above experimental results, in the case of Examples 1 to 13 using base-free cooling conditions in an inert atmosphere, the yield of the product was 78 to 87% and the purity thereof was 95 to 100%.

In addition, in the case of Comparative Example 1 in which the condition of not using a hydrogen halide removal reagent was not applied, it was confirmed that both purity and yield decreased when the purification step increased and separation occurred.

In addition, in the case of Comparative Example 2 using diethyl ether instead of tetrahydrofuran as the hydrophobic solvent, it was confirmed that thiolane used as a starting material had a very low solubility in diethyl ether, so both yield and purity for the compound represented by Chemical Formula 2-6 were decreased.

In addition, even in the case of Comparative Example 3 in which inert atmosphere was not applied, it was confirmed that the starting material, 2-chloro-1,3,2-dioxaphospholane, was decomposed to form a polymer, resulting in a decrease in both yield and purity.

In addition, even in the case of Comparative Example 4, which did not provide cooling conditions, it was confirmed that both yield and purity decreased.

In conclusion, when the cyclic compound represented by Chemical Formula 1 was reacted with the thiolane-based cyclic compound in a hydrophobic solvent under a base-free condition to synthesize the compound represented by Chemical Formula 2, and the reaction was performed at −20 to 20° C. under an inert atmosphere to synthesize the asymmetric phosphate-based compound, it was confirmed that reaction stability was excellent without using a hydrogen halide removal reagent and improved yield was provided by reducing side reactions.

The invention claimed is:

1. A method of preparing an asymmetric phosphate-based compound, comprising synthesizing a compound represented by Chemical Formula 2 below by reacting a cyclic compound represented by Chemical Formula 1 below with a thiolane-based cyclic compound in a hydrophobic solvent under a base-free condition, wherein the reaction is performed at −20 to 20° C. under an inert atmosphere

[Chemical Formula 1]

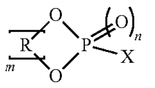

[Chemical Formula 2]

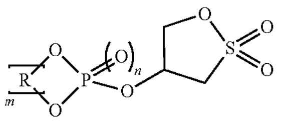

In Chemical Formulas 1 and 2, R is a substituted or unsubstituted alkylene having 1 to 3 carbon atoms, substitution is independently selected from a halogen, a hydroxyl group, an alkyl group having 1 to 8 carbon atoms, a heteroalkyl group having 3 to 6 carbon atoms, a ketone group, a vinyl group having 1 to 5 carbon atoms, or an aryl group having 6 to 10 carbon atoms, the alkyl group, heteroalkyl group, and aryl group are independently substituted with a halogen, X is chlorine (Cl), bromine (Br), fluorine (F), or iodine (I), n is an integer from 0 to 1, and m is an integer from 1 to 5 (When n is 0, the phosphorus (P) atom has an unshared electron pair instead of oxygen).

2. The method according to claim 1, wherein the thiolane-based cyclic compound is 4-hydroxy-1,2-oxathiolane-2,2-dioxide.

3. The method according to claim 1, wherein, based on 100 parts by weight of the cyclic compound represented by Chemical Formula 1, the thiolane-based cyclic compound is added in an amount of 85 to 330 parts by weight.

4. The method according to claim 1, wherein the cyclic compound represented by Chemical Formula 1 is added dropwise at a temperature of −10 to 10° C.

5. The method according to claim 1, wherein the hydrophobic solvent comprises one or more selected from tetrahydrofuran, dioxane, ethyl acetate, methyl acetate, acetonitrile, methyl ethyl ketone, acetone, isobutyl methyl ketone, cyclic ethers, cyclic esters, and cyclic ketones.

6. The method according to claim 1, wherein the hydrophobic solvent from which moisture has been removed is added.

7. The method according to claim 1, wherein, based on 100 parts by weight of the cyclic compound represented by Chemical Formula 1, the hydrophobic solvent is added in an amount of 50 parts by weight or more.

8. The method according to claim 1, wherein the reaction comprises preparing a reactant solution by mixing the hydrophobic solvent and the cyclic compound represented by Chemical Formula 1; adding the hydrophobic solvent and the thiolane-based cyclic compound under an inert atmosphere and cooling to −20 to 20° C.; and adding the reactant solution dropwise under an inert atmosphere while maintaining the cooling temperature, and then performing stirring while increasing the temperature to room temperature to remove hydrogen halide and perform condensation.

9. The method according to claim 1, wherein the reaction further comprises performing recrystallization for purification under an inert atmosphere.

10. The method according to claim 1, wherein the compound represented by Chemical Formula 2 comprises one or more selected from the group consisting of compounds represented by Chemical Formulas 2-1 to 2-22 below

[Chemical Formulas 2-1 to 2-10]

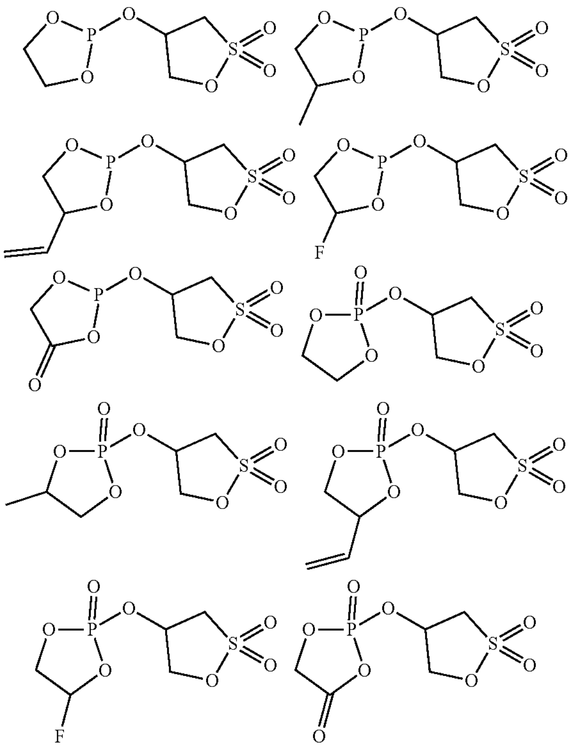

[Chemical Formulas 2-11 to 2-22]

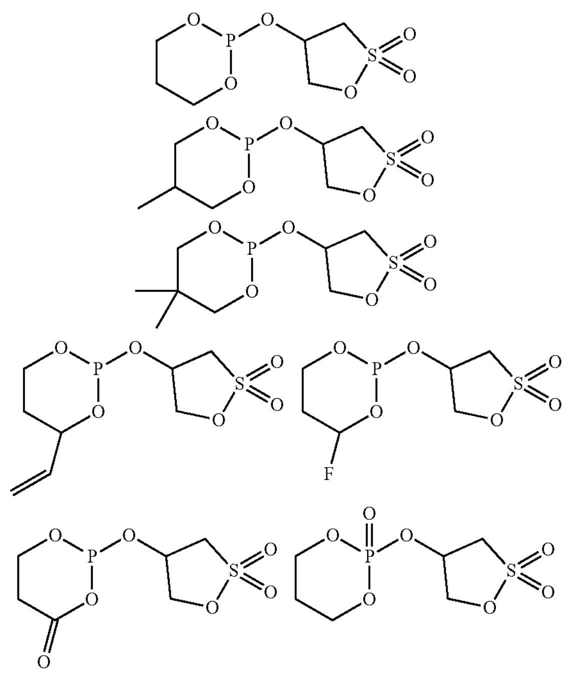

-continued

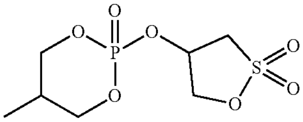

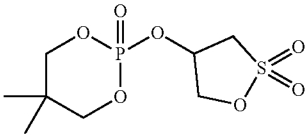

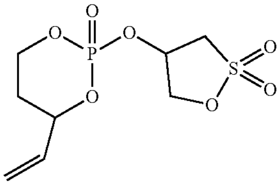

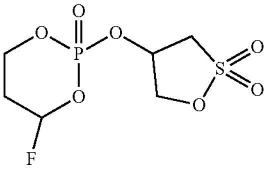

-continued

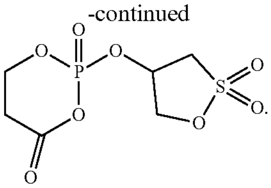

11. The method according to claim 1, wherein the reaction yield is 80 or more, and a purity of the compound represented by Chemical Formula 2 is 90 or more.

12. The method according to claim 1, wherein the cyclic compound represented by Chemical Formula 1 is obtained by reacting phosphorus trichloride and ethylene glycol in a hydrophobic solvent having a boiling point lower than that of the hydrophobic solvent.

13. The method according to claim 1, wherein the cyclic compound represented by Chemical Formula 1 is obtained by oxidizing, in a hydrophobic solvent having a boiling point higher than that of the hydrophobic solvent, a halo hyproxy-based compound obtained by reacting phosphorus trichloride and ethylene glycol in a hydrophobic solvent having a boiling point lower than that of the hydrophobic solvent.

* * * * *